Aug. 12, 1958  D. B. SMITH  2,847,642
FLUX GATE COMPASS
Filed May 10, 1952  2 Sheets-Sheet 1
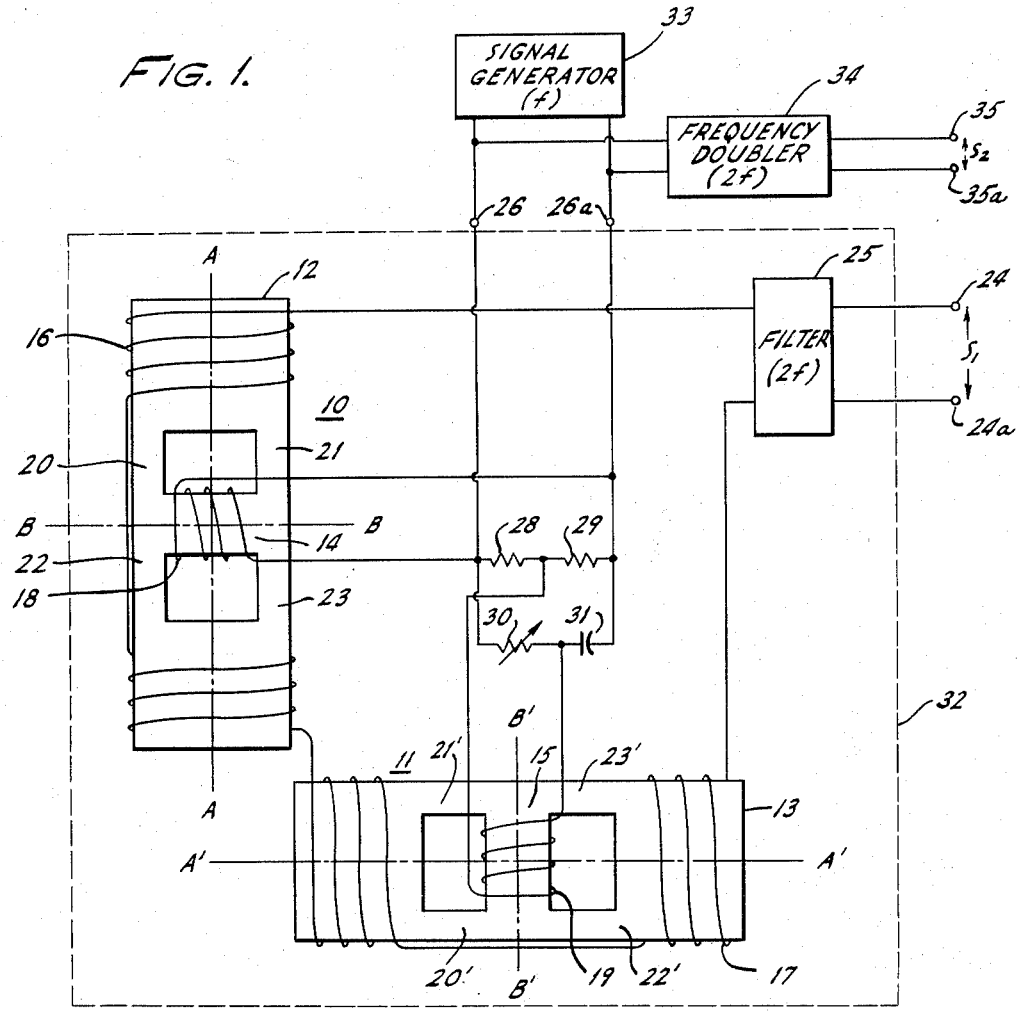
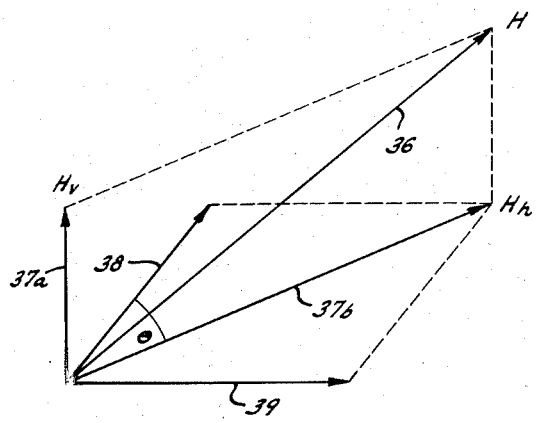
INVENTOR.
DAVID B. SMITH
BY
ATTORNEY

INVENTOR.
DAVID B. SMITH

United States Patent Office 2,847,642
Patented Aug. 12, 1958

2,847,642

FLUX GATE COMPASS

David B. Smith, Meadowbrook, Pa., assignor to Philco Corporation, Philadelphia, Pa., a corporation of Pennsylvania Application May 10, 1952, Serial No. 287,172

2 Claims. (Cl. 324—43)

This invention relates to angular displacement indicators and, more particularly, to innovations in systems for producing electrical indications of the angular displacement of an object from the direction of orientation of an external magnetic field.

Such systems find frequent application in the magnetic compass art where they are used to produce electrical indications of the angular displacement of an object from the orientation of the earth's magnetic field. Of course, they can also be applied when a local magnetic field is artificially produced and it is desired to ascertain the orientation of an object with respect to this field.

In either case, the particular merit of such systems lies in the fact that they express their angular displacement intelligence directly in terms of electrical signals which can be readily transmitted to a remote location by conventional means and there utilized to give indications of angular displacement. These systems are therefore particularly advantageous for use with remotely located orientation indicators such as are employed in so-called radar relay systems, for example. These are systems which are used to reproduce a radar display at a location remote from the radar antenna.

The form which the electrical signals representative of angular displacement intelligence take is a matter of considerable importance in determining the usefulness of such relay systems. Particularly desirable among the various possibilities is the one in which there is produced an alternating signal, preferably of substantially sinusoidal waveform, whose phase displacement relative to another sinusoidal signal of the same, or of a harmonically related frequency is equal to the angular displacement of the object from a reference orientation, such as that of the earth's magnetic field.

The prior art knew of systems which produced signals of the above-described form, but they all required selsyn-type motor arrangements with complicated moving parts and electrical connections to these moving parts. Such arrangements were particularly objectionable when they had to be installed on an unstable platform, like an airplane or a ship, where their moving machinery made it difficult, if not impossible, to stabilize them with respect to the plane of the earth's field, as is required for accurate orientation indication.

It is, accordingly, a primary object of the invention to provide an improved system for producing electrical indications of the angular displacement between the orientation of an object and the orientation of an external magnetic field.

It is another object of the invention to provide an improved system for producing a signal whose phase, relative to the phase of a reference signal, is equal to the angular displacement between the orientation of an object and that of an external magnetic field.

It is still another object of the invention to provide a system for producing a signal whose phase, relative to the phase of a reference signal, is equal to the angular displacement between the orientations of an object and of an external magnetic field, the system being characterized in that all of its components may be fixed with respect to the object.

To the foregoing general ends, I provide apparatus which is exposed to the influence of the external magnetic field relative to which object orientation is to be determined. This apparatus comprises a plurality of magnetic modulators, each of which is capable of producing an alternating signal whose amplitude is proportional in an algebraic sense to that component of the external magnetic field which lies along a particular axis of the magnetic modulator and whose amplitude in general is independent of any component of the external magnetic field normal to the aforementioned axis. In one form of the invention, a pair of these magnetic modulators are physically mounted so as to be capable of measuring two external magnetic field components which are mutually perpendicular to each other. Hence the resultant alternating output signals of the magnetic modulators will be proportional to the sine and cosine respectively of the external magnetic field in the plane of the two modulators and independent of the field component normal to this plane. Means are provided to establish a phase quadrature relationship between the two output signals. Hence, when these two are additively combined, they will form a final output signal whose phase is directly related to the angle between the external magnetic field and a physical axis of the magnetic modulators, as will be described more fully hereinafter.

The particular manner in which apparatus embodying my inventive concept is constructed and arranged will be more clearly apparent from the following detailed description considered in conjunction with the accompanying drawings wherein:

Figure 1 shows a preferred embodiment of the invention;

Figure 2 is a vector diagram to which reference will be made in explaining certain operational relationships of the system of Figure 1.

Figure 3:
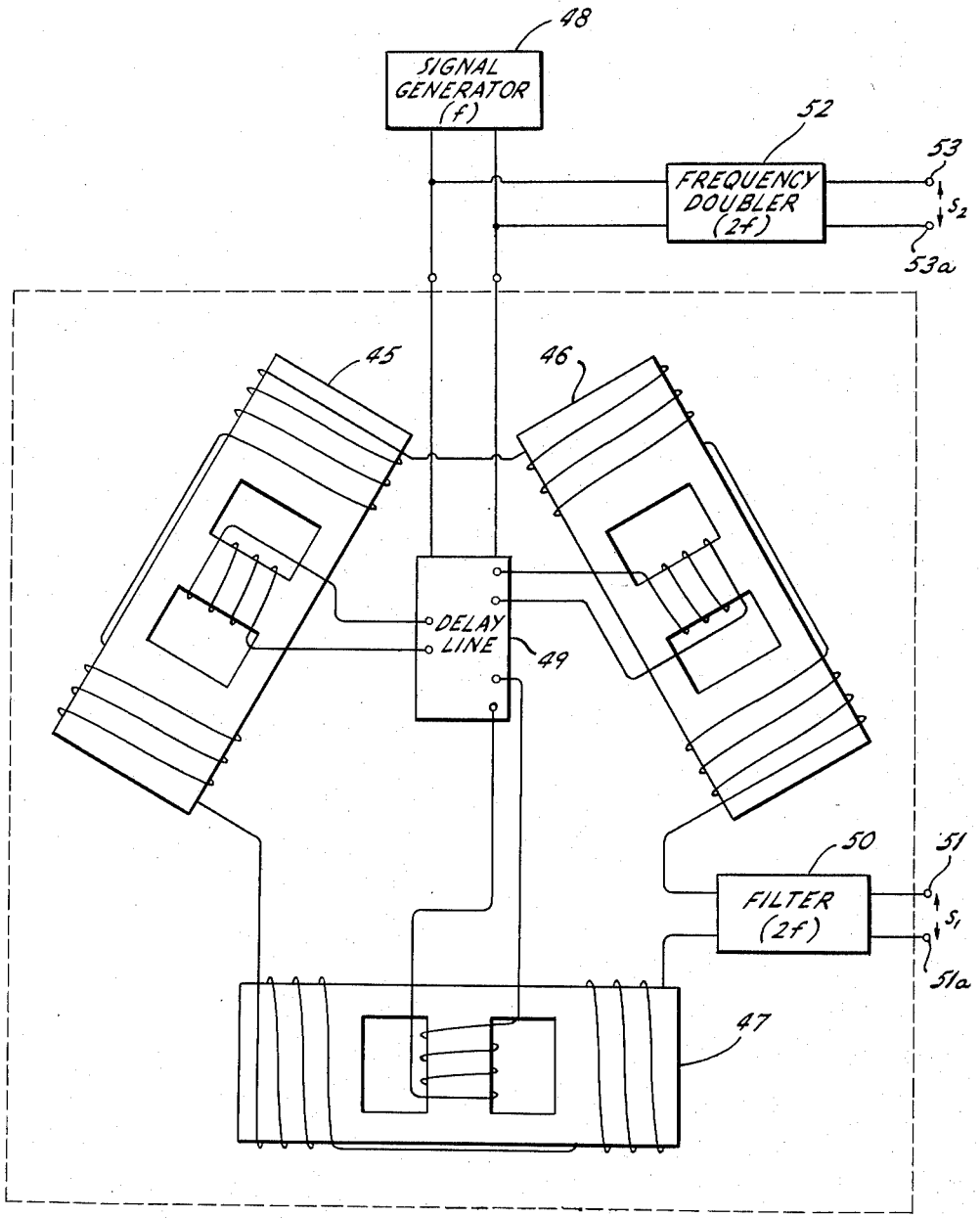
Figure 3 shows an alternative embodiment of the invention.

As shown in Figure 1, to which more particular reference may now be had, a preferred embodiment of the invention consists of a pair of matched magnetic modulators 10 and 11, the elongated ferromagnetic cores of which are designated respectively by reference numerals 12 and 13. Each of these cores is pierced by two centrally located apertures, the two apertures in each core being separated by transverse members of core material, respectively designated 14 and 15. A conductor forms on core 12 a winding 16 whose axis is substantially parallel to the longitudinal axis A—A of the core. In order to accommodate the maximum number of conductor turns on a core of restricted length, the winding preferably extends to both sides of the apertured center portion of the core. A similar conductor forms on core 13 a winding 17 with its axis substantially parallel to the longitudinal axis A'—A' of the core. A third conductor forms a winding 18 about the transverse member 14 of core 12, this winding being so oriented that its axis B—B is transverse to the longitudinal axis A—A of core 12. A fourth conductor is formed into winding 19 on the transverse member 15 of core 13 in such a manner that its axis B'—B' is transverse to the longitudinal axis A'—A' of core 13. Cores 12 and 13 are disposed in mutual perpendicularity so that the axes of windings 16 and 17 are likewise mutually perpendicular. The two magnetic modulators are preferably matched to be the same both magnetically and electrically. Further, the units are preferably symmetrical physically, electrically and magnetically about their long axes A—A and A'—A', respectively, and about their short axes B—B and B'—B', respectively. Each core has similar sections 20, 21, 22 and 23 and 20', 21', 22' and 23' of restricted cross-section and each is arranged so that the magnetic material in these sections will tend to saturate at the same magnetic level and well before either the transverse members 14 and 15 or the end portions of the cores.

At this point, it may be stated that cores 12 and 13, together with the windings arranged thereon in the manner hereinbefore indicated, constitute devices well known in the art as "flux gates." A detailed description of such flux gates is presented in chapter 9 of "Saturating Core Devices" by Leonard R. Crow, published 1949 by the Scientific Book Publishing Co., Vincennes, Indiana. Accordingly, no invention is predicated upon the individual constructions of these devices nor on their disposition relative to each other. Rather the invention resides in their novel cooperation with each other and with other elements of the circuit now to be described.

In accordance with the invention, the windings 16 and 17 are connected electrically in series and are jointly connected to a pair of output terminals 24 and 24a through a filter 25. Winding 18 is connected directly to another pair of terminals 26 and 26a and winding 19 is connected to the same terminals 26 and 26a through a conventional constant amplitude phase shifting network comprising resistors 28, 29 and 30 and condenser 31. The entire apparatus hereinbefore described, after assembly and adjustment of resistor 30 in accordance with principles hereinafter set forth, may be imbedded in a matrix of some dielectric material such as a melamine resin so as to preserve, as nearly as possible, the original alignment and adjustment of all the component parts. The physical outline of such a matrix has been diagrammatically indicated in Fig. 1 by broken line 32 which encloses the aforedescribed components. Terminals 24, 24a, 26 and 26a may be disposed externally of this matrix to provide the required connections to the several windings. To terminals 26 and 26a, there is further connected an externally disposed signal generator 33 productive of alternating signals of a predetermined frequency $f$. This alternating signal produced by signal generator 33 is also supplied to frequency doubler 34 which may be conventionally constructed to produce signals of twice the frequency of the signals supplied thereto, or of frequency $2f$ in the present instance and which bear a predetermined phase relationship to the signals from generator 33 supplied thereto. For reasons which will appear hereinafter, filter 25, which may be of conventional construction, is arranged to transmit signals of this same frequency $2f$ to the substantial exclusion of signals at all other frequencies. Consequently, there will be available between terminals 24 and 24a, a signal $S_1$ having such components of frequency $2f$ as are produced in the windings 16 and 17 of magnetic modulators 10 and 11. At the output terminals 35 and 35a of frequency doubler 34, on the other hand, there will be available a signal $S_2$ also of frequency $2f$ and bearing constant phase relationship to the signal frequency $f$ produced by generator 33.

The operation of the system whose components have been described hereinbefore is as follows. Considering first the simple magnetic modulator 10, it will be noted that a primary alternating signal from generator 33 is supplied to winding 18 which sets up an alternating magnetomotive force which in turn sets up an alternating flux in the core 12. Due to symmetry of the structure, this flux, in the absence of any external magnetic field will divide equally between the upper and lower half of the core, and again due to symmetry will induce no voltage across the total winding 16. The amount of primary drive signal should be large enough to saturate the core at the restricted sections 20, 21, 22 and 23. Consider now the case wherein there is a constant magnetic field along the axis A—A of core 12. This external field will induce a longitudinal flux in the core, particularly in the reduced sections 20, 21, 22 and 23 and hence will establish a magnetic bias or change the level at which these sections will saturate. For example, for the half cycle of alternating drive signal for which the flux therefrom adds to the externally-induced flux in sections 20 and 23, the flux will subtract in sections 21 and 22. Hence sections 20 and 23 will saturate at a lower and 21 and 22 at a higher level of applied magnetomotive force than would be the case in the absence of the external field. The net result of this unbalance of the device is to cause a pulse of flux to flow longitudinally in core 12 during this half cycle. During the next cycle of drive signal, the levels at which the restricted sections saturate reverses, causing a similar pulse of flux to flow longitudinally in the core in the same direction as in the first instance. Hence there is induced in winding 16 a signal comprising the second and higher even harmonics of the driving signal in winding 18. Preferably the second harmonic is used and the higher harmonics removed by filter 25. By suitably balanced construction of this magnetic modulator 10 the signal which it produces may be made directly proportional to the amplitude of the external magnetic field, and its phase will be established by the phase of the driving signal. Reversal of the direction of the external magnetic field along the axis A—A will reverse the polarity of the signal in winding 16. However, due to the symmetry of the structure an external magnetic field normal to the axis A—A will not unbalance the magnetic modulator in such a way as to cause an output signal in the winding 16. Hence the output signal may be considered to be proportional in an algebraic sense to that component of external magnetic field lying along the axis A—A and to no other.

Now let us consider the case in which the apparatus of Figure 1 is located in a horizontal position, that is, the axis A—A of core 12 and the axis A'—A' of core 13 lie in a horizontal plane, and the axis of winding 16 forms an azimuth angle $\theta$ with respect to magnetic north. In general, the magnetic field of the earth will then pass obliquely through the plane defined by these axes. This field can, however, be resolved into two orthogonal components, one normal to the plane of these axes, and one parallel to this plane. In Figure 2 of the drawings, to which reference may now be had, the earth's magnetic field H has been diagrammatically represented by vector 36. Its vertical component $H_v$ has then been represented by vector 37a, normal to the plane of the core axes, and its horizontal component $H_h$ has been represented by vector 37b, parallel to the same plane. The vertical component $H_v$ has no effect upon the operation of the system of Figure 1 and hence may be neglected. The horizontal component $H_h$, on the other hand, may again be resolved into two orthogonal components, respectively parallel to the axes A—A and A'—A' of cores 12 and 13 and respectively represented, in Figure 2, by vectors 38 and 39. These two horizontal components 38 and 39 will be proportional to the product of the magnitudes of the horizontal component of the earth's field and of the cosine and sine, respectively, of the azimuth angle $\theta$ formed by this horizontal component of the earth's field and vector 38. Hence the amplitudes of the output signals from modulators 10 and 11 will be respectively proportional to the cosine and sine of the azimuth angle $\theta$ between the axis A—A of core 12 and magnetic north. If the two output signals produced by these modulators are arranged to be in phase quadrature, the signal produced by adding them directly will have a phase angle, with respect to a reference signal of constant phase, which is equal to the azimuth angle $\theta$.

The desired phase quadrature relationship may be obtained by a suitable phase shift network in either the input or the output circuit. In Figure 1, the phase shift is obtained by shifting the phase of the driving signal for winding 19 with respect to the phase of the driving signal for winding 18 by 45 degrees. Then, by virtue of the fact that the output frequency is twice that of the input frequency, the required ninety degree phase shift of the output signal is obtained. Alternatively, a ninety degree phase shifting device could be used to shift the phase of the output signal produced by winding 17 prior to its additive combination with the output signal of winding 16.

A suitable reference signal may be obtained directly from signal generator 33, whose output signal contains all the necessary information for reference purposes. However, a preferred form of reference signal may be obtained by passing the signal from generator 33 through frequency doubler 34 to form the second harmonic signal $S_2$. In this case, the signal $S_1$, which results from the additive combination of voltages across coils 16 and 17, may be made to differ from $S_2$ only in the relative phase angle between them and this phase angle will be equal to the azimuth angle $\theta$. As the unit consisting of two magnetic modulators is rotated through 360 degrees in the earth's field, the phase angle between the two signals $S_1$ and $S_2$ will likewise vary through 360 degrees, and this phase angle will properly represent the azimuth angle for every physical orientation of the unit.

While the results hereinbefore described have been fully verified experimentally, they are also susceptible of theoretical demonstration as will now be shown. Let:

$e_1$=the voltage across winding 16
$e_2$=the voltage across winding 17
$\omega$=angular velocity of the driving signal from generator 33
$H_h$=horizontal component of the external magnetic field
$g$=the conversion gain (i. e., volts/gauss) of each magnetic modulator
$\phi_1$=the phase shift produced by the phase shifting network 28, 29, 30, 31, i. e., 45° for second harmonic operation
$\phi_2$=the arbitrary phase angle of signal generator 33

Then:

$e_1 = g.H_h.\cos\theta.\cos 2(\omega t + \phi_2)$
$e_2 = g.H_h.\sin\theta.\cos 2(\omega t + \phi_1 + \phi_2)$ } for all values of $\theta$ for $\phi_1 = 45°$
$S_1 = e_1 + e_2 = g.H_h.\cos[2(\omega t + \phi_2) + \theta]$ On the other hand, the signal $S_2$ obtained by frequency doubling the drive signal is $S_2 = \cos 2(\omega t + \phi_2)$ Hence the phase difference between $S_1$ and $S_2$ is the required information, that is, the azimuth angle.

In the embodiment of Figure 1 it was shown how a signal generator, a pair of magnetic modulators and certain auxiliary apparatus may be combined so as to cooperate in the production of a phase reference signal and of a signal whose phase departure from the phase of the reference signal is representative of the azimuth angle of orientation between the apparatus and an external magnetic field. However, neither the use of two magnetic modulators, nor their disposition in space quadrature is essential to the accomplishment of this objective, as will be seen by reference to Figure 3 of the drawings, in which there is illustrated an alternative embodiment of the invention.

This alternative embodiment comprises three magnetic modulators, designated by reference numerals 45, 46 and 47, respectively. The individual construction of any one of these modulators may be substantially identical to the construction of either of modulators 10 or 11 of Figure 1, as may be their individual modes of operation. A detailed review of these individual characteristics is therefore not believed to be necessary. Suffice it to recall that each modulator, when supplied with an alternating drive signal, will produce an output signal whose amplitude is proportional to the magnitude of that component of an external magnetic field which lies parallel to the longitudinal axis of the modulator core. In the embodiment of Figure 3, these individual modulators are now arranged so that their longitudinal axes form a 120 degree angle relative to each other. It may be shown, by an analysis generally similar to that carried out for the embodiment of Figure 1 but which takes into account the inclusion of a third modulator and the changed angle of orientation between modulators, that if the output signals of these three modulators are derived in mutual 120 degree phase relationship, then they may be combined to produce a single resultant signal whose phase varies in substantially direct proportion to the angular displacement between the orientation of an external magnetic field component parallel to the plane defined by the axes of the three modulators and the longitudinal axis of any one of these modulators. To produce these output signals in the required phase relationship, there may be provided a signal generator 48 similar to generator 33 of Figure 1 and likewise productive of alternating signals of a predetermined frequency $f$. The output from this signal generator may then be supplied to a delay line 49 of conventional construction, comprising three pairs of output terminals so placed along the delay line that signals derived from different ones of these pairs of terminals will differ mutually in phase by 60 degrees. Different pairs of these output terminals are then connected to different driving windings of the different modulators. By virtue of the frequency doubling action within these modulators, which was explained in detail in connection with the operation of Figure 1, the output signals produced by these modulators will then be mutually displaced in phase by the required 120 degrees. Since harmonics of the drive signal other than the second may also be produced by the magnetic modulators, a filter 50 similar to filter 25 of Figure 1 may be provided in the output circuit of these modulators, this filter being conventionally constructed so as to transmit only signals of frequency $2f$ to the substantial exclusion of signals of all other frequencies. There will then be produced between terminals 51 and 51a, a signal $S_1$ substantially similar to the signal $S_1$ produced between terminals 24 and 24a of Figure 1. Again as in the case of Figure 1, the output signal from signal generator 48 may be directly utilized as a phase reference signal. However, this signal is preferably supplied to a frequency doubler 52 which produces an output signal of frequency $2f$ which bears constant predetermined phase relation to the output signal of frequency $f$ produced by generator 48. This signal, which is designated $S_2$ in Figure 3, then appears between output terminals 53 and 53a and corresponds to the signal $S_2$ appearing between output terminals 35 and 35a of Figure 1.

Apparatus for transmitting the intelligence representative signal thus produced, as well as the phase reference signal to distant locations, and apparatus for utilizing these signals to give indications of angular displacement are well known and need not be considered here. For detailed discussion of such related apparatus, reference may be had to chapter 17 of Radar Systems Engineering which constitutes volume 1 of the Radiation Laboratory Series, published 1947 by McGraw-Hill Book Co., Inc., New York.

Modifications of the apparatus hereinbefore described will occur to those skilled in the art without departing from my inventive concept. For example, the aforementioned flux variations need not be produced by means of additional windings such as 18 and 19 in Figure 1. Instead an air gap may be provided in each core and the flux variations may then be produced by mechanical variation of the physical dimensions of the air gaps. I therefore, desire the scope of this concept to be limited only by the appended claims.

I claim:
1. In combination: first, second and third magnetic modulators, each of said modulators being provided with a core of ferromagnetic material, said cores having their respective longitudinal axes disposed in a predetermined common plane and displaced from each other by 120 degrees, each of said modulators being responsive to an applied electrical signal and to an external magnetic field parallelling the axis of its core to develop a varying electrical signal of amplitude proportional to the intensity of said axis parallelling field; a source of electrical signals of predetermined frequency; means for applying signals from said source to said modulators; means for deriving, from said modulators respectively, signals developed by said modulators in response to said applied signals in mutual 120 degree phase relation; means for additively combining said derived signals to produce a single resultant signal; means for selecting from said single resultant signal only components of substantially twice said predetermined frequency; and means for deriving from said source a signal of reference phase for said derived components.

2. The combination of claim 1 further characterized in that said signal of reference phase is derived at the same frequency as said selected components.

References Cited in the file of this patent

UNITED STATES PATENTS

| | | |
|---|---|---|
| 2,424,562 | Fragola | July 29, 1947 |
| 2,435,276 | Holmes | Feb. 3, 1948 |
| 2,439,701 | Sturart | Apr. 13, 1948 |
| 2,476,273 | Beach | July 19, 1949 |
| 2,524,360 | Russell | Oct. 3, 1950 |
| 2,749,506 | Emerson | June 5, 1956 |

UNITED STATES PATENT OFFICE

CERTIFICATE OF CORRECTION

Patent No. 2,847,642                                               August 12, 1958

David B. Smith

It is hereby certified that error appears in the above numbered patent requiring correction and that the said Letters Patent should read as corrected below.

In the drawings, sheets 1 and 2, line 2, and in the heading to the printed specification, line 2, title of invention, for "FLUX GATE COMPASS", in each occurrence, read -- FLUX VALVE COMPASS --; column 3, line 11, for '"flux gates."' read -- "flux valves". --; line 12, for "flux gates" read -- flux valves --.

Signed and sealed this 12th day of May 1959.

(SEAL)
Attest:

KARL H. AXLINE
Attesting Officer

ROBERT C. WATSON
                                                                   Commissioner of Patents